United States Patent [19]

Inami et al.

[11] 4,090,734

[45] May 23, 1978

[54] REINFORCEMENT MEMBER FOR AN AUTOMOBILE DOOR

[75] Inventors: Sumio Inami; Kiyoshi Koike; Masayoshi Hayashida; Shigeyuki Yamaoka, all of Yokohama, Japan

[73] Assignee: Nissan Motor Company, Ltd., Japan

[21] Appl. No.: 726,192

[22] Filed: Sep. 24, 1976

[30] Foreign Application Priority Data

Oct. 1, 1975    Japan .................. 50-134162[U]

[51] Int. Cl.² ............................................. B60J 5/04
[52] U.S. Cl. .................................... 296/146; 52/618
[58] Field of Search .............. 296/146, 28 R; 49/502; 52/618, 732

[56] References Cited

U.S. PATENT DOCUMENTS

| 3,263,387 | 8/1966 | Simpson | 52/732 |
| 3,868,796 | 3/1975 | Bush | 296/146 |
| 3,938,288 | 2/1976 | Roubinet | 296/146 |
| 3,964,208 | 6/1976 | Renner | 49/502 |

FOREIGN PATENT DOCUMENTS

| 2,426,705 | 11/1975 | Germany | 296/146 |
| 1,962,279 | 6/1971 | Germany | 296/146 |
| 2,319,124 | 10/1974 | Germany | 49/502 |
| 1,959,988 | 6/1971 | Germany | 49/502 |

Primary Examiner—Joseph F. Peters, Jr.
Assistant Examiner—John A. Carroll

[57] ABSTRACT

A reinforcement member for an automobile door is constructed of a central piece formed from a plate of a high tensile strength steel and two end pieces of a mild steel that is the same material as the material forming an inner panel of the automobile door. The two end pieces are secured to end portions of the central piece and formed with attachment areas, respectively, at which the reinforcement member is secured to the door inner panel.

3 Claims, 4 Drawing Figures

REINFORCEMENT MEMBER FOR AN AUTOMOBILE DOOR

BACKGROUND OF THE INVENTION

The present invention relates to a reinforcement member for an automobile door.

Usually an automobile door includes a reinforcement member in order to minimize deformation of the door toward the passenger compartment upon receiving lateral loads during lateral collision of the automobile.

A main object of the present invention is to provide a reinforcement member which is of low weight and easy to be secured to an inner panel of an automobile door.

BRIEF DESCRIPTION OF THE DRAWINGS

Other objects and advantages of the present invention will become clear from the following description in connection with the accompanying drawings, in which.

DESCRIPTION OF THE PREFERRED EMBODIMENTS

Figure 1:
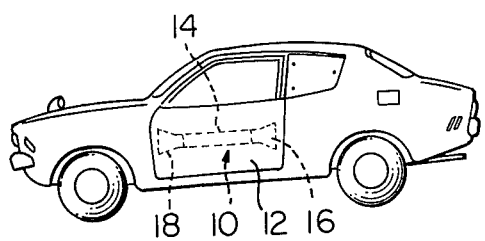
FIG. 1 illustrates an automobile having a door reinforced by a reinforcement member according to the present invention.
Figure 2:
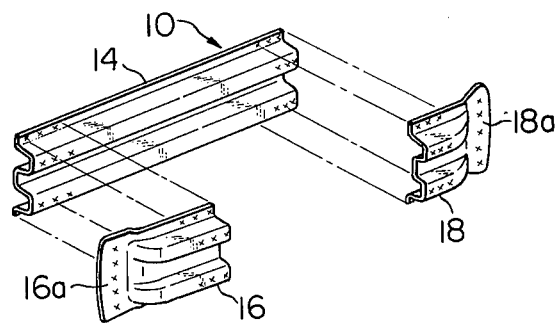
FIG. 2 is an exploded view of the reinforcement member shown in FIG. 1.

Referring to FIGS. 1 and 2, reference numeral 10 indicates a reinforcement member for an automobile door 12 to reinforce the same. As best seen in FIG. 2 the reinforcement member 10 is constructed of or split into an elongated central piece 14 and two end pieces 16 and 18.

The central piece 14 is formed from a rectangular plate of a high tensile strength steel and has a cross section with an undulation. Secured to two longitudinally spaced end portions of the central piece 14 are the end pieces 16 and 18, respectively. Each of the end pieces 16 and 18 is formed from a plate of a mild steel and has at one end portion thereof a cross section with an undulation similar to the undulation of the central piece 14 so that the end pieces 16 and 18 are secured to the central piece 14 in an overlapping manner. At the opposite end portions of each of pieces 16 and 18 an attachment area is provided indicated at 16a or 18a, at which the reinforcement member 10 is attached, such as, by welding or bonding, to an inner panel, not shown, of the automobile door 12. The inner panel of the automobile door 12 is made of a mild steel.

Figure 3:
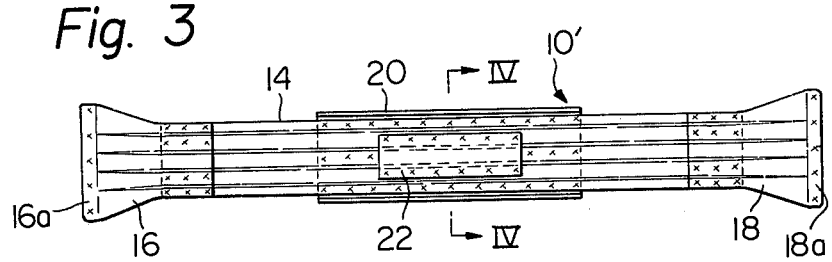
FIG. 3 is a plane view of a second embodiment of a reinforcement member according to the present invention.
Figure 4:
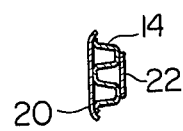
FIG. 4 is a cross sectional view taken through line IV—IV shown in FIG. 3.

The embodiment shown in FIGS. 3 and 4 is different from the embodiment shown in FIG. 2 in that a central piece 14 of a reinforcement member 10' is made rigid in construction by securing two plates 20 and 22 to both sides of the central piece 14. As best seen in FIG. 4 the crests of the undulation of the central piece 14 are bridged by the plates 20 and 22.

If desired only one of the plates 20 and 22 may suffice the purpose of making the central piece 14 rigid.

From the preceding description it will now be observed that:

Because the overlapping portions between the central piece and the two end pieces are narrow and the central piece is made of a high tensile strength steel plate, the reinforcement member 10 or 10' is low in weight and in cost.

Because the reinforcement member 10 or 10' is split into the end pieces of a mild steel formed with an attachment area and into the central piece of a high tensile strength steel, the central piece can be formed from a plate of a high tensile strength steel only by pressing or rolling the plate into a uniform cross section and because the central piece can be used without any modification for all types of automobile doors only by changing the end pieces, manufacturing cost of the reinforcement members will be reduced.

Because the end pieces formed with the attachment areas at which the reinforcement member is secured to the automobile door inner panel are made of the same material as the material forming the door inner panel, welding or bonding the end pieces to the door inner panel is easy.

Although in the embodiment in the preceding a vehicle body employs only one reinforcement member, it may use a plurality of such reinforcement members, if desired. In the latter case relatively narrow reinforcement members can be used.

What is claimed is:

1. In an automobile:
    a door having an inner panel made of a mild steel;
    a reinforcement member having
        an elongated central piece made of a high tensile strength steel, the central piece having a cross section with an undulation and two end portions spaced from each other along a longitudinal direction of the central piece, and
        two end pieces made of a similar mild steel to the mild steel of which said inner panel is made, the two end pieces being secured to the central piece at the two end portions of the central piece, respectively, the two end pieces being formed with attachment areas, respectively, and being welded at that attachment areas to the inner panel of said door.

2. The combination as claimed in claim 1, in which crests of the undulation on one side of the central piece are bridged by at least one plate.

3. The combination as claimed in claim 2, in which crests of the undulation on the opposite side of the central pieces are bridged by at least one plate.

* * * * *